No. 757,252. Patented April 12, 1904.

UNITED STATES PATENT OFFICE.

ERNST BIDTEL, OF MILWAUKEE, WISCONSIN.

MAGNESIA CEMENT COMPOSITION.

SPECIFICATION forming part of Letters Patent No. 757,252, dated April 12, 1904.

Application filed June 29, 1903. Serial No. 163,644. (No specimens.)

*To all whom it may concern:*

Be it known that I, ERNST BIDTEL, a citizen of the United States, residing at Milwaukee, in the county of Milwaukee and State of Wisconsin, have invented certain new and useful Improvements in Magnesia Cement Compositions; and I do hereby declare the following to be a full, clear, and exact description of the invention, such as will enable others skilled in the art to which it appertains to make and use the same.

My invention relates to the production of a novel fireproof magnesia cement, the object being to provide a pulverized mixture which by the addition of water only will be brought into chemical reaction, causing the composition to bind and set and become exceedingly hard; and it consists of the various constituent parts hereinafter fully described and claimed.

Magnesia cements as now made generally consist of burned pulverized magnesite, which is mixed with a suitable filling—such as sand, pulverized quartz or marble, asbestos, sawdust, coloring-matter, Portland cement, &c.—to which is added a liquid solution of chlorid of magnesium. The binding results from the chemical combination of chlorid of magnesium and water with the magnesia contained in the burned magnesite, such combination being expressed in the following formula:

$$MgCl_2 5MgO + 17H_2O.$$

Hence for the production of such cements a material containing magnesia is necessary, as is also a solution of chlorid of magnesium in water. This renders the use of such cement expensive, particularly if the same is to be used at a distant point, for the reason that the powder and liquid must both be shipped, thus making the freight charges very high and rendering handling both difficult and expensive.

The main object of my present invention is to obviate the necessity of shipping the liquid by producing a pulverized mixture of such materials as will chemically combine by the addition of water only. This I effect by mixing with the burned pulverized magnesia-containing substance and the filling such substances as will form magnesium chlorid by complete chemical reaction as soon as water is added. These substances are magnesium sulfate or Epsom salt, on the one hand, and barium chlorid, on the other hand. For substances containing magnesia either burned and pulverized magnesite or pulverized dolomite burned at a temperature of from 600° to 800° centigrade is used. These finely-pulverized materials are mixed with a suitable filling—such as sand, ground quartz or marble, coloring-matter, &c.—and by the addition of water will enter into chemical reaction, the magnesia sulfate and barium chlorid reacting to form magnesium chlorid, which in turn reacts on the magnesite or dolomite and causes the entire mass to bind and set. The proportionate weights of the various elements must be such that there is no excess of either one, so that there will be no excess of any material entering into the chemical combination. The relative quantities to be used I have determined to approximate, by weight, 245.84 parts of Epsom salt ($MgSO_4 + 7H_2O$) to 243.56 parts of barium chlorid, ($BaCl_2 + 2H_2O$.) Mixing the latter in the presence of water will result in $MgCl_2 + BaSO_4$.

In mixing a solution of magnesium chlorid with magnesia the chemical combination $MgCl_2 5MgO + 17H_2O$ is produced, and to produce practically the same result with the materials used in my composition the following relative quantities are necessary: two hundred parts, by weight, burned magnesite, ($MgO$,) or about four hundred parts, by weight, burned dolomite, ($MgOCaCO_3$,) 245.84 parts, by weight, $MgSO_4 + 7H_2O$, 243.56 parts, by weight, $BaCl_2 + 2H_2O$. For the production of cement which is to be used in a very short time after its preparation Epsom salt ($MgSO_4 + 7H_2O$) will answer. It is well known, however, that Epsom salt containing seven parts water loses one part when exposed for some time to the action of dry air, and the part thus evaporated would be taken up by the burned magnesite ($MgO$) and chemically bound thereby, and this would cause the mixture to lose its binding qualities, so that in preparing my mixture to be kept in stock or shipped long distances it is essential that Epsom salt having only six or less parts water should be used—that is, Epsom salt having the formula ($MgSO_4+6H_2O_4$) should be substituted. The superfluous part of water is readily removable by heating the Epsom salt to a temperature of 120° to 140° Fahrenheit. The mixture of magnesite with magnesia sulfate and barium chlorid results in $MgCl_2,5MgO+17H_2O+BaSO_4$. As the magnesite is never chemically pure and always contains more or less impurities, the latter must be taken into consideration and the amount of magnesite be correspondingly increased.

Dolomite ($MgCO_3CaCO_3$) burned at 600° to 800° centigrade gives $MgOCaCO_3$, while if burned at a temperature approximating 1,000° centigrade the result will be the production of calcium oxid, which is not adapted for my purpose. If dolomite is used in place of magnesite, the proportionate quantity must be about double, but must necessarily vary, owing to variations in the percentage of magnesia contained therein, and the result of its use would be the production of $$MgCl_2,5MgO+17H_2O+BaSO_4+CaCO_3,$$

the latter ($CaCO_3$) remaining in the mixture, but not entering the chemical combination, just as the $BaSO_4$ remains.

At the moment of adding water the first and immediate chemical reaction is the formation of $MgCl_2$, and immediately this combines with the MgO, which starts the process of binding and sets in about six to ten hours, depending upon the temperature.

The relative quantity of filling to be used is determined by the purpose for which the cement is to be used.

I claim as my invention—

1. The new composition of matter comprising magnesia, in combination with magnesium sulfate and barium chlorid.

2. The new composition of matter consisting of a substance containing magnesia, in combination with magnesium sulfate and barium chlorid.

3. The new composition of matter comprising a substance containing magnesia, in combination with magnesium sulfate, barium chlorid, and a filling.

4. The new composition of matter comprising burned magnesite, in combination with magnesium sulfate and barium chlorid.

5. The new composition of matter consisting of burned, pulverized magnesite, in combination with magnesium sulfate, barium chlorid, and a filling.

6. The new dry-powder compound, comprising burned, pulverized magnesite, in combination with magnesium sulfate and barium chlorid, adapted, by the addition of water, to form a cement.

7. The new dry-powder compound, comprising burned, pulverized magnesite, in combination with magnesium sulfate, barium chlorid and a filling, adapted, by adding water, to form a cement.

8. The new composition of matter having the formula $MgCl_2,5MgO+17H_2O+BaSO_4$.

9. The new composition of matter comprising magnesium sulfate and barium chlorid, in combination with magnesia in substantially the relative proportions set forth.

10. The new composition of matter comprising magnesium sulfate and barium chlorid, in combination with burned magnesite, in substantially the relative proportions hereinbefore described.

11. The herein-described method of producing magnesia cement which consists in mixing with a pulverized substance containing magnesia, pulverized magnesium sulfate and barium chlorid, and by the addition of water effecting the instantaneous production of magnesium chlorid and barium sulfate, the magnesium chlorid immediately combining with the magnesia, resulting in immediately starting the binding process and thereby causing the entire mass to gradually set, the barium sulfate remaining as a filling which is indissoluble in water, substantially as described.

In testimony whereof I affix my signature in presence of two witnesses.

ERNST BIDTEL.

Witnesses:
RUDOLPH WM. LOTZ,
E. F. WILSON.